United States Patent
Tsuchihashi et al.

(10) Patent No.: US 8,888,133 B2
(45) Date of Patent: Nov. 18, 2014

(54) WORK VEHICLE WITH A GROUND-WORK UNIT

(71) Applicant: Kubota Corporation, Osaka (JP)

(72) Inventors: Hironori Tsuchihashi, Sakai (JP);
Takahiro Shiraga, Sakai (JP);
Takafumi Komatsu, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/775,544

(22) Filed: Feb. 25, 2013

(65) Prior Publication Data

US 2014/0062075 A1    Mar. 6, 2014

(30) Foreign Application Priority Data

Jun. 5, 2012   (JP) .................................. 2012-128317

(51) Int. Cl.
| | | |
|---|---|---|
| *B62D 1/04* | (2006.01) | |
| *B62D 1/16* | (2006.01) | |
| *B60K 37/02* | (2006.01) | |
| *A01D 34/64* | (2006.01) | |

(52) U.S. Cl.
CPC . *B62D 1/16* (2013.01); *B60K 37/02* (2013.01); *A01D 34/64* (2013.01)
USPC ................................ 280/779; 74/492; 74/552

(58) Field of Classification Search
CPC ............ B62D 1/16; B62D 1/18; B62D 1/183; B62D 1/187; B62D 1/189; B62D 1/20; A01D 34/00; G06F 3/01; G06F 3/02; B66F 9/06; B66F 9/07568; B66F 9/0759
USPC .......... 74/492, 493, 552; 180/89.13; 187/222; 280/775, 779; 345/156, 173
See application file for complete search history.

(56) References Cited

U.S. PATENT DOCUMENTS

| | | | | |
|---|---|---|---|---|
| 3,078,945 A | * | 2/1963 | Frey | 180/271 |
| 3,248,965 A | * | 5/1966 | Floria | 74/552 |
| 3,269,210 A | * | 8/1966 | Steele, Jr. et al. | 74/492 |
| 4,655,308 A | * | 4/1987 | Kraus et al. | 180/78 |
| 5,442,942 A | * | 8/1995 | Geisler | 70/209 |
| 5,660,244 A | * | 8/1997 | Matsuda | 180/68.1 |
| 6,320,497 B1 | * | 11/2001 | Fukumoto et al. | 340/425.5 |

(Continued)

FOREIGN PATENT DOCUMENTS

| | | | | |
|---|---|---|---|---|
| JP | 07207705 | A | * | 8/1995 |
| JP | 10076868 | A | * | 3/1998 |

(Continued)

*Primary Examiner* — Joseph M Rocca
*Assistant Examiner* — Laura Freedman
(74) *Attorney, Agent, or Firm* — The Webb Law Firm

(57) ABSTRACT

A work vehicle has a ground-work unit that is mounted under a frame supported by front wheels and rear wheels and disposed forwardly of the front wheels. The work vehicle includes a steering wheel supported to a steering post and consisting of spokes and a ring. A man-machine interface face formed in the steering post downwardly of the steering wheel and around a rotational axis of the steering wheel includes a display face having a flat panel display and an operation face having an operation input device. The steering wheel is greater in size than the flat panel display as seen in the direction of rotational axis of the steering wheel, and the operation face is greater in length than the flat panel display in the direction of vehicle width.

11 Claims, 11 Drawing Sheets

(56) References Cited

U.S. PATENT DOCUMENTS

| | | | |
|---|---|---|---|
| 6,499,550 B2 * | 12/2002 | Matsuda et al. | 180/90 |
| 6,609,357 B1 | 8/2003 | Davis et al. | |
| 6,720,679 B2 * | 4/2004 | Harada et al. | 307/328 |
| 6,752,228 B2 * | 6/2004 | Aoyama et al. | 180/89.12 |
| D538,302 S | 3/2007 | Higashikawa | |
| 7,290,829 B2 * | 11/2007 | Umemoto et al. | 296/190.08 |
| 7,648,001 B2 * | 1/2010 | Yanagihara et al. | 180/336 |
| 7,812,473 B2 * | 10/2010 | Larsen et al. | 307/10.1 |
| 8,171,907 B2 * | 5/2012 | Koenen et al. | 123/179.3 |
| 8,446,265 B2 * | 5/2013 | Golomb | 340/425.5 |
| 8,483,927 B2 * | 7/2013 | Matsuzaki et al. | 701/93 |
| 8,494,754 B2 * | 7/2013 | Fukumoto et al. | 701/103 |
| 8,626,407 B2 * | 1/2014 | Fujimoto | 701/50 |
| 2006/0288682 A1 | 12/2006 | Samejima et al. | |
| 2009/0265082 A1 | 10/2009 | Nishi et al. | |
| 2012/0227535 A1 * | 9/2012 | Backman | 74/552 |
| 2013/0030667 A1 * | 1/2013 | Fujimoto et al. | 701/93 |

FOREIGN PATENT DOCUMENTS

| | | | |
|---|---|---|---|
| JP | 10234202 A | * | 9/1998 |
| JP | 2000335452 A | * | 12/2000 |
| JP | 2002106401 A | | 4/2002 |
| JP | 2006205764 A | * | 8/2006 |
| JP | 2007076459 A | * | 3/2007 |

* cited by examiner

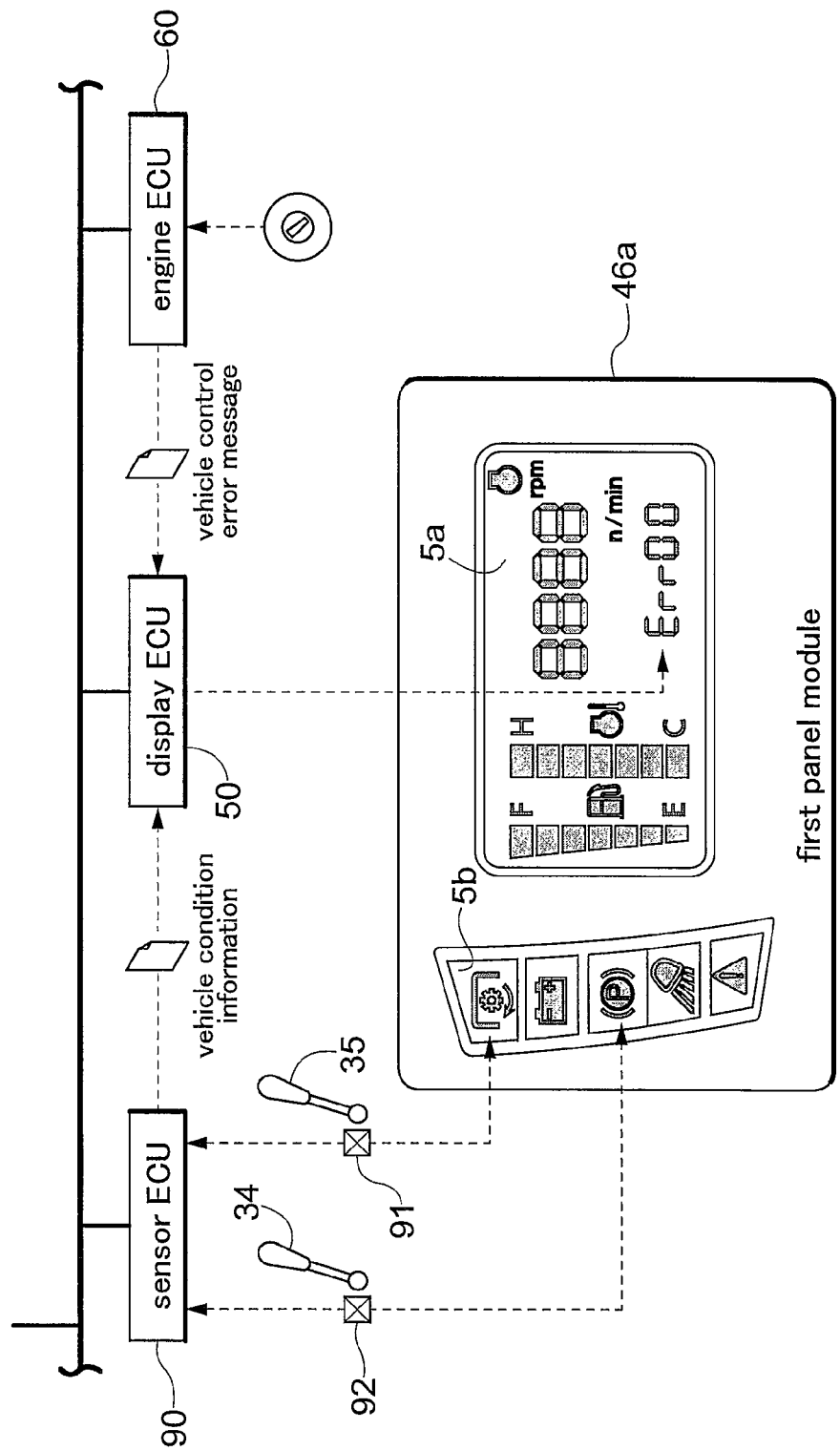

WORK VEHICLE WITH A GROUND-WORK UNIT

BACKGROUND OF THE INVENTION

1. Field of the Invention

The present invention relates to a work vehicle having a ground-work unit that is mounted under a frame supported by front wheels and rear wheels and disposed forwardly of the front wheels.

2. Description of the Related Art

For instance, a front mower as a work vehicle mounting a mower unit as a ground-work unit is disclosed in US 2006/0288682 A1 (FIG. 1 and FIG. 2). In this front mower, the mower unit is mounted under a vehicle body and forwardly of the front wheels, and a steering post is disposed to extend vertically from the front end of the vehicle body. In operation, a driver seated at a driver's seat will grip a steering wheel attached to an upper portion of the steering post for maneuvering the vehicle and check the condition of ongoing grass mowing work by viewing the periphery of the mower unit.

For maneuvering a vehicle, not only an operation of the steering wheel, but also operations of an accelerator operation lever and various operation switches are required. U.S. Pat. No. D 538,302 S discloses a front mower having such operation levers and switches provided on an upper portion of the steering post.

Further, U.S. Pat. No. 6,609,357 B1 (FIG. 1), for instance, discloses a work vehicle such a lawn maintenance tractor wherein in order to inform a driver of various kinds of information relating to a work accompanied by vehicle traveling, a flat panel display such as a liquid crystal display is disposed at the center of a wide operation panel which is disposed forwardly of the steering wheel.

In case of a work vehicle having a ground-work unit such as a lawn maintenance tractor, during a work accompanied by vehicle traveling, the driver operates the steering wheel as well as an operation lever or switch, but the driver needs to occasionally view the contents shown on the flat panel display also in order to carry out the work accompanied by vehicle traveling appropriately. At the same time, the driver needs to monitor the periphery of the mower unit as well. Therefore, it is required to ensure for the driver the possibility of as much as possible both the field of vision for the steering wheel, the operation device, the flat panel display and the field of vision for the periphery of the mower unit.

SUMMARY OF THE INVENTION

According to the present invention, there is proposed a work vehicle having a ground-work unit that is mounted under a frame supported by front wheels and rear wheels and disposed forwardly of the front wheels, the work vehicle comprising:

a steering post disposed upwardly of the frame;

a steering wheel supported to the steering post and consisting of spokes and a ring; and a man-machine interface face formed in the steering post downwardly of the steering wheel and around a rotational axis of the steering wheel;

wherein the man-machine interface face includes a display face having a flat panel display and an operation face having an operation input device and disposed adjacent the display face; and wherein the steering wheel is greater in size than the flat panel display as seen in the direction of rotational axis of the steering wheel, and the operation face is greater in length than the flat panel display in the direction of vehicle width.

With the above-described arrangement, the driver as seated can operate the operation input device by only moving his/her hand gripping the steering wheel downwards and can visually confirm information displayed on the flat panel display through an opening (or a cutout) formed on the inner side of the gripping portion of the steering wheel. Further, as the length of the operation face in the vehicle width direction is set greater than the flat panel display, there is provided greater freedom in the layout of the display face of the operation input device.

In the above, in order to allow the driver to view the flat panel display panel in its entirety through the opening of the steering wheel with sufficient and comfortable margin, preferably, at least one opening delimited by the spokes and the ring of the steering wheel is formed larger than the flat panel display.

According to one preferred embodiment of the present invention, the operation face is disposed within an outer periphery of the steering wheel as seen in the direction of the rotational axis of the steering wheel. With this arrangement, the operation face too is disposed in the vicinity of the rotational axis of the steering wheel, so that the driver can check the operation face through the opening formed between the spokes and the ring of the steering wheel. Further, the arrangement eliminates the need for enlarging the steering post due to the presence of the operation face and/or the flat panel display. Hence, the steering post can be formed thin or narrow, whereby the visibility of the periphery of the ground-work unit for the driver can be improved.

For providing clear distinction of the kind of the device to be operated, advantageously, a plurality of the operation input devices are disposed in distribution on the left side and the right side relative to the rotational axis of the steering wheel. Accordingly, it becomes advantageously possible to implement such an arrangement in which the operation face is divided into a left operation face portion disposed on the left side of the rotational axis of the steering wheel and a right operation face portion disposed on the right side of the same, and the display face is disposed on the front side in the vehicle body longitudinal direction.

Normally, the field of vision of the driver during driving extends around the rotational axis of the steering wheel as the center thereof. In order to make it easier for the driver under driving posture to see the display contents of the flat panel display, it is advantageous if the display face of the flat panel display is oriented towards the face of the driver under the driving posture. Accordingly, advantageously, the flat panel display is disposed with an inclination so that the normal line of its display face and the rotational axis of the steering wheel intersect each other upwardly of the steering wheel at an angle of from 5 to 30 degrees, preferably, at about 15 degrees.

According to one preferred embodiment of the present invention, the steering post consists of a first steering post supported to the frame and a second steering post supported to the first steering post to be pivotable in the front/rear direction of the vehicle body and supporting the steering wheel. With this arrangement, the steering wheel can be changed in its posture together with the second steering post. With this, it becomes possible to change the posture of the steering wheel to be suitable for the posture of the driver for maneuvering or for driver's getting on/off the vehicle.

In a work vehicle such as a front mower, the steering post is exposed to the outside, so for the sake of appearance or the like, a molded product is generally used as the steering post. In such case, in order to readily realize an intricate contour of the steering post, a separate-part assembly is preferred. Such separate-part assembly can be realized by composing the first steering post of a base panel fixed to the front end of the frame and an auxiliary panel fixed to the base panel in such a manner as to cover the front side of the base panel. Further, if the display face is formed in the upper face of the auxiliary panel, this will relax the molding requirement for the auxiliary panel, thus making it easier to employ such a contour for the auxiliary panel that is suitable for accommodation of the flat panel display.

Leaving the attaching portion between the base panel and the fame exposed to the outside would be problematic from the aesthetic point of view. This problem can be solved if the lower portion of the auxiliary panel is formed as a skirt portion for covering the front end of the frame from the front side thereof.

BRIEF DESCRIPTION OF THE DRAWINGS

FIG. 11 is block diagram showing relationship between the display control system and a man-machine interface panel.

DETAILED DESCRIPTION OF THE PREFERRED EMBODIMENTS

Next, a front mower will be explained as an embodiment of a work vehicle relating to the present invention, with reference to the accompanying drawings.

Figure 1:
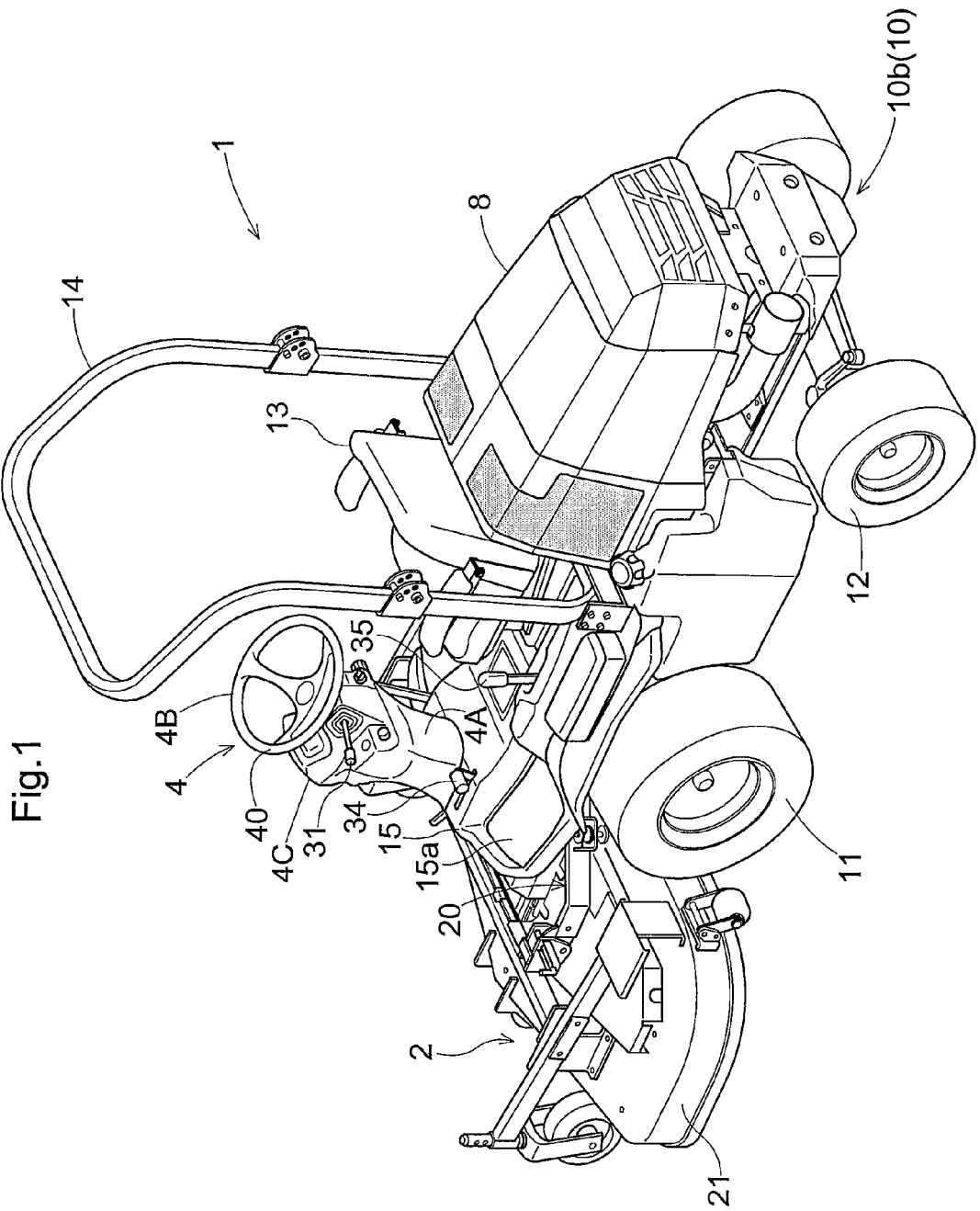
FIG. 1 is a perspective view of a front mower.
Figure 2:
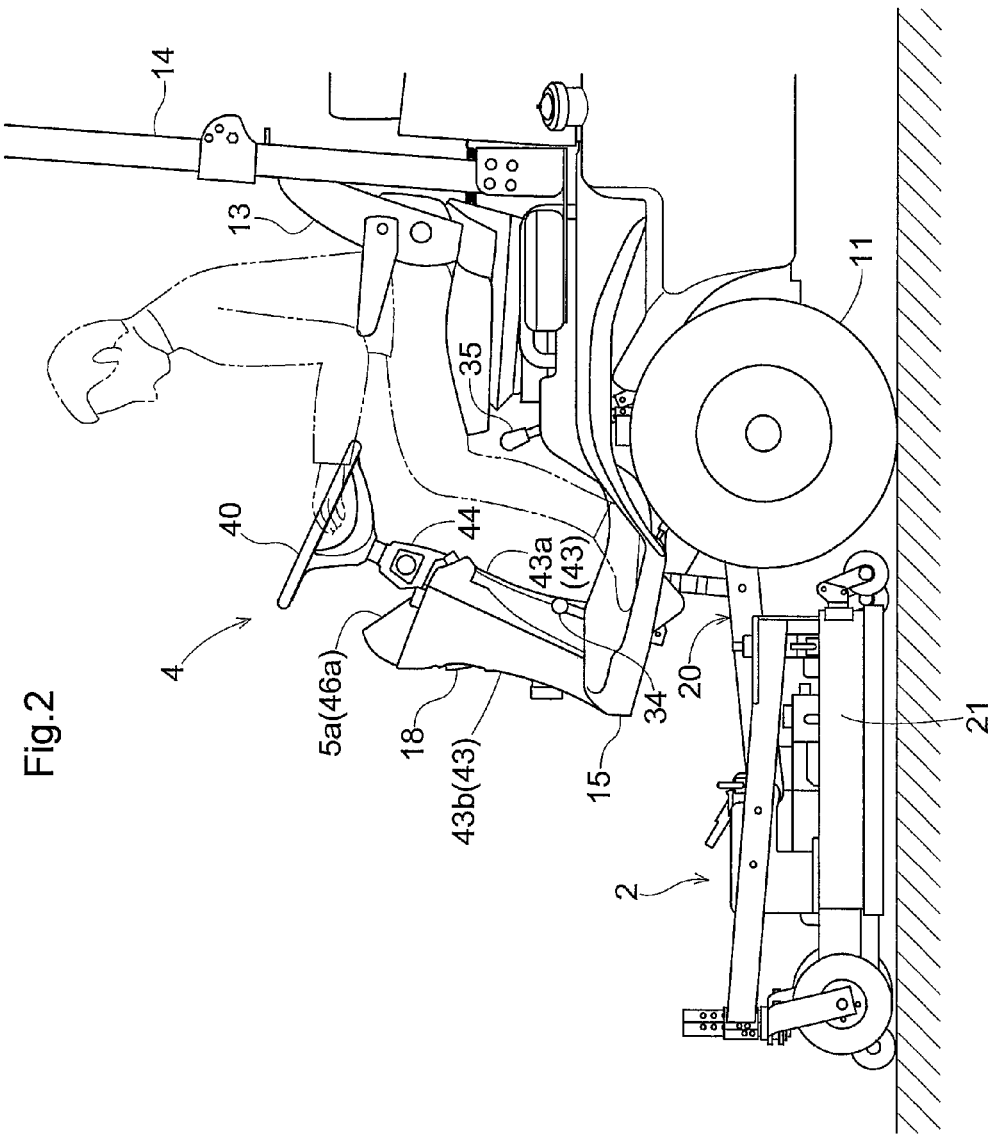
FIG. 2 is a side view showing a front half portion of the front mower.

FIG. 1 shows a perspective view showing this front mower as seen in an obliquely rearward direction and FIG. 2 shows a side view showing the front half region of the front mower.

A frame 10 constituting a vehicle body 1 of the front mower is supported on front wheels 11 and rear wheels 12. The frame 10 consists of a front frame 10a and a rear frame 10b, each of which includes left and right vertical members extending along the longitudinal direction (traveling direction) of the vehicle body 1 and cross members interconnecting them. A mower unit 2 as a ground utility work unit is supported via a lift mechanism 20 to be lifted up/down, with the mower unit 2 projecting forwardly from the front frame 10a on the front side of the front wheels 11 and downwardly of the front frame 10a. In this description, unless indicated otherwise, terms indicative of positional relationship such as front (forward), rear (backward) are used relative to the longitudinal direction (traveling direction) of the vehicle body 1.

Figure 3:
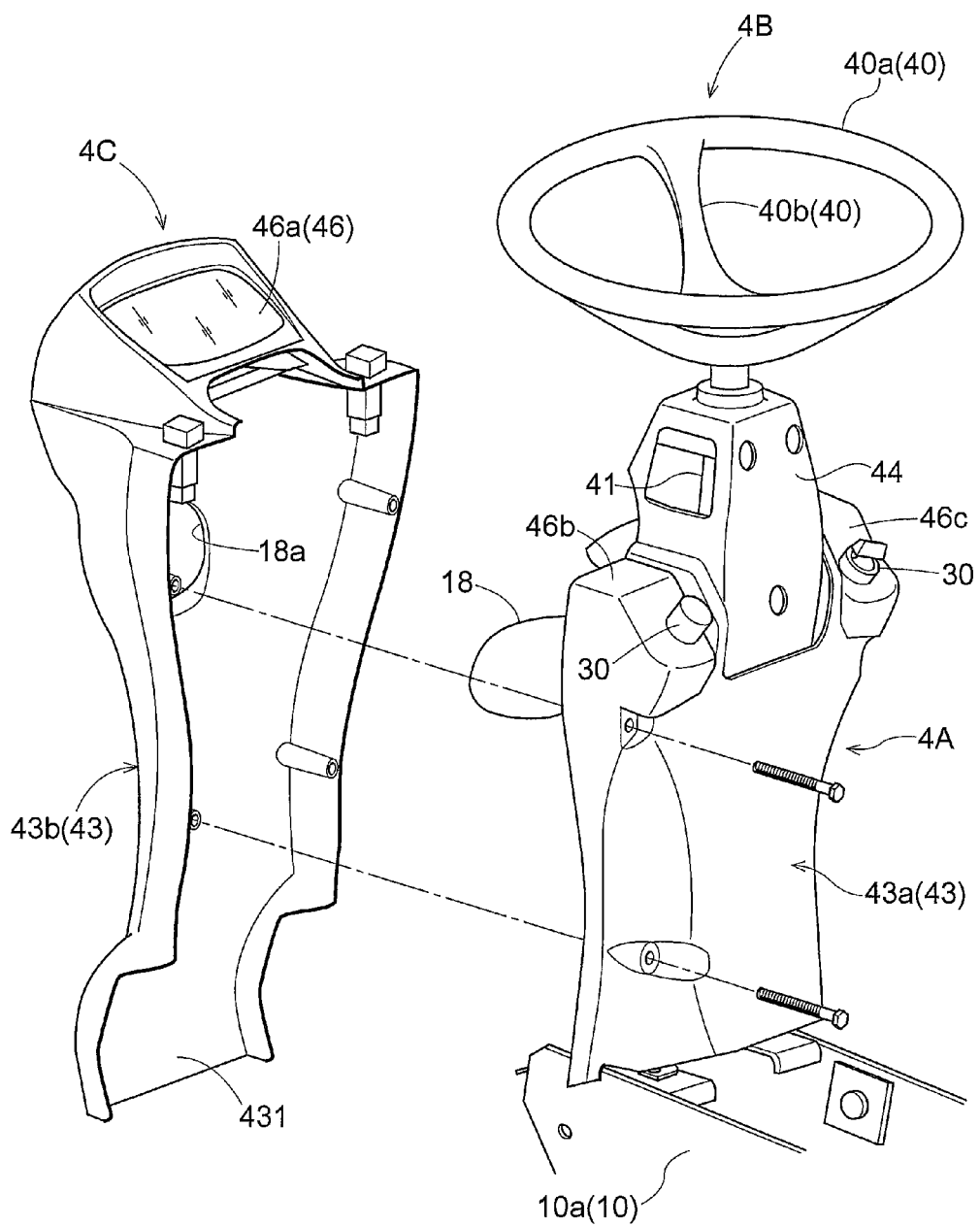
FIG. 3 is an exploded perspective view of a steering post.
Figure 4:
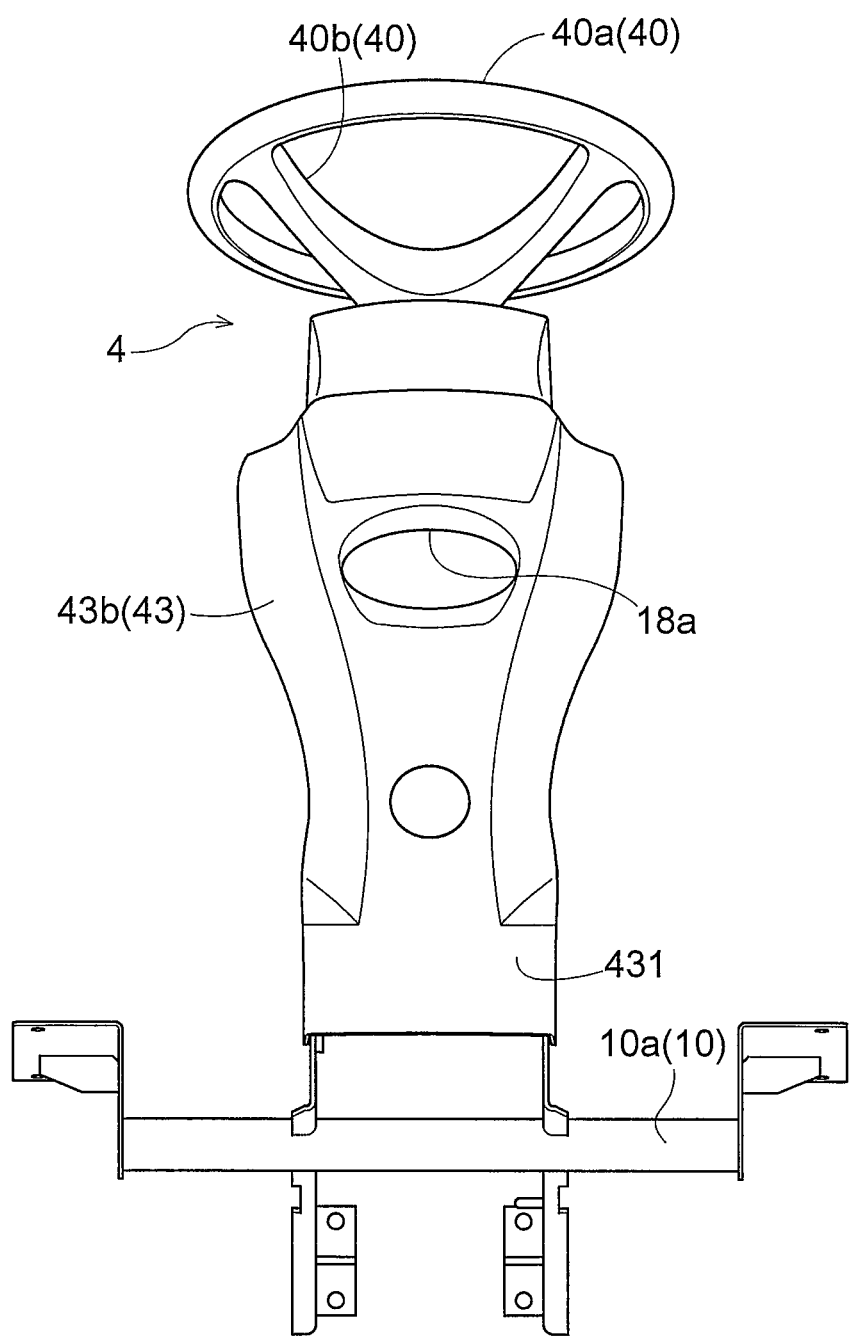
FIG. 4 is a front view of a steering device.
Figure 5:
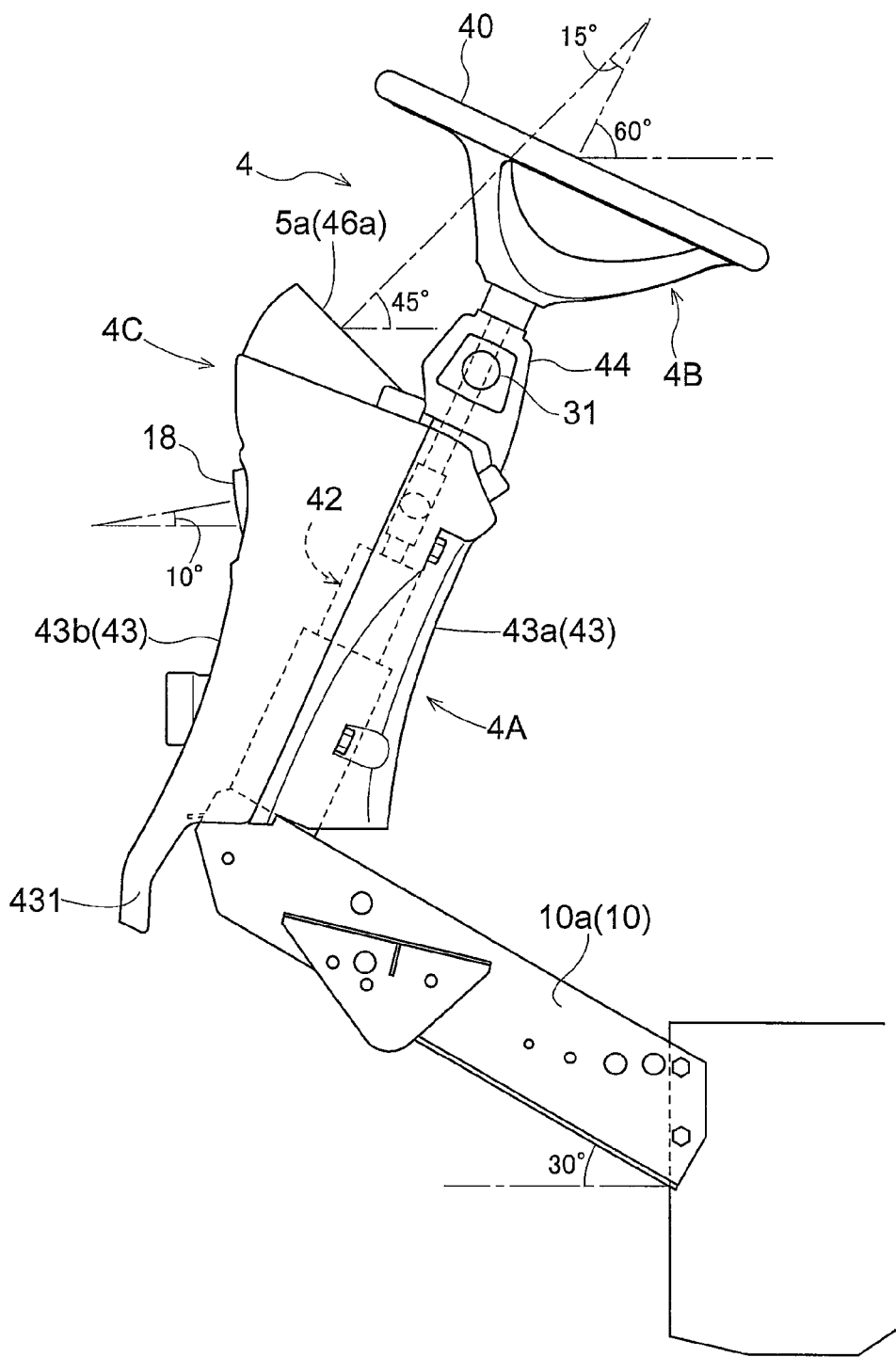
FIG. 5 is a side view of the steering device.

The front half region of the vehicle body 1 is a driving region. In this region, a steering device 4 is disposed at the front end area of the front frame 10a and a driver's seat 13 is disposed at the rear end area of the front frame 10a. As shown in FIG. 3, FIG. 4 and FIG. 5, the steering device 4 includes a steering post 4A extending upwardly with a slight rearward inclination from the front end area of the front frame 10a at substantially center in the vehicle body width direction, a steering wheel unit 4B supported to the steering post 4A and a man-machine interface panel unit 4C.

The steering post 4A consists of a first steering post 43 fixed to a cross beam constituting the front end of the front frame 10 and a second steering post 44 connected to the upper end of the first steering post 43. The first steering post 43 is a hollow body forming an accommodating space therein and as may be apparent from FIG. 3, this is a bolt-connected two-part assembly consisting of a rear panel 43a as a base panel and a front panel 43b as an auxiliary panel. As the front panel 43b forms the front side (face) of the front mower, a skirt portion 431 is formed at the lower portion of this front panel 43b. This skirt portion 431 is configured to cover the connecting arrangement between the rear panel 43a and the frame 10. The first steering post 43 exhibits an inverted triangular shape when seen in the front/rear direction of the vehicle body, but has a curved outer contour. Further, when seen in the vehicle body width direction, the upper portion of the auxiliary panel 43b protrudes forwardly. At the upper portion of the first steering post 43, there are formed a pair of left and right projecting portions that project in the form of bifurcation; and in the recessed space created therebetween, the second steering post 44 is inserted. The second steering post 44 too is a hollow body and has an approximately angular pillar-like shape to be snugly fitted within the recessed space of the first steering post 43.

The steering wheel unit 4B includes a steering wheel 40 consisting of spokes 40b and a ring 40a; and a steering shaft 41 operably connected to the steering wheel 40. The steering shaft 41 is accommodated in the hollow interior of the second steering post 44. An angular displacement of the steering shaft 41 is transmitted to a power steering unit 42 constituting a full hydraulic power steering mechanism which per se is known, thus providing a change of steering angle of the steerable wheels (the rear wheels 12 in the case of the present embodiment). In this embodiment, the second steering post 44 is mounted to be pivotable in the front/rear direction relative to the first steering post 43, thus providing readiness in tilting adjustment of the steering wheel 40 as well as readiness in a driver's getting on/off the vehicle. To this end, a universal joint is disposed between the steering shaft 41 and the power steering unit 42 and the power steering unit 42 is substantially accommodated inside the first steering post 43.

The man-machine interface panel unit 4C comprises a group of panel modules 46 including interface devices for effecting informing/alerting outputs for informing/alerting the driver of e.g. conditions of various instruments. For each member of the panel module group 46, there is formed a man-machine interface face which constitutes a display face easily viewed by the driver and/or a control face easily operable by the driver. Here, the panel module group 46 is disposed in the periphery of the rotational axis of the steering wheel 40, i.e. the rotational axis of the steering shaft 41. More particularly, the panel module group 46 includes a first panel module 46a disposed adjacent the front side of the second steering post 44, a second panel module 46b disposed adjacent one lateral side of the second steering post 44 and a third panel module 46c disposed adjacent the other lateral side of the second steering post 44.

The first panel module 46a disposed on the front side of the driver seated at the driver's seat 13 is arranged on the top face of the front panel 43b and creates a display face thereon. The second panel module 46b and the third panel module 46c, disposed in correspondence with the hands of the driver seated at the driver's seat 13, are arranged on the respective top faces of the left and right projections of the rear panel 43a. The second panel module 46b creates a left-side operation face facing the steering wheel 40 and the third panel module 46*c* creates a right-side operation face facing the steering wheel 40. In this case, the display face, the left-side operation face and the right-side operation face are included in the man-machine interface for the driver positioned downwardly of the steering wheel 40.

Figure 6:
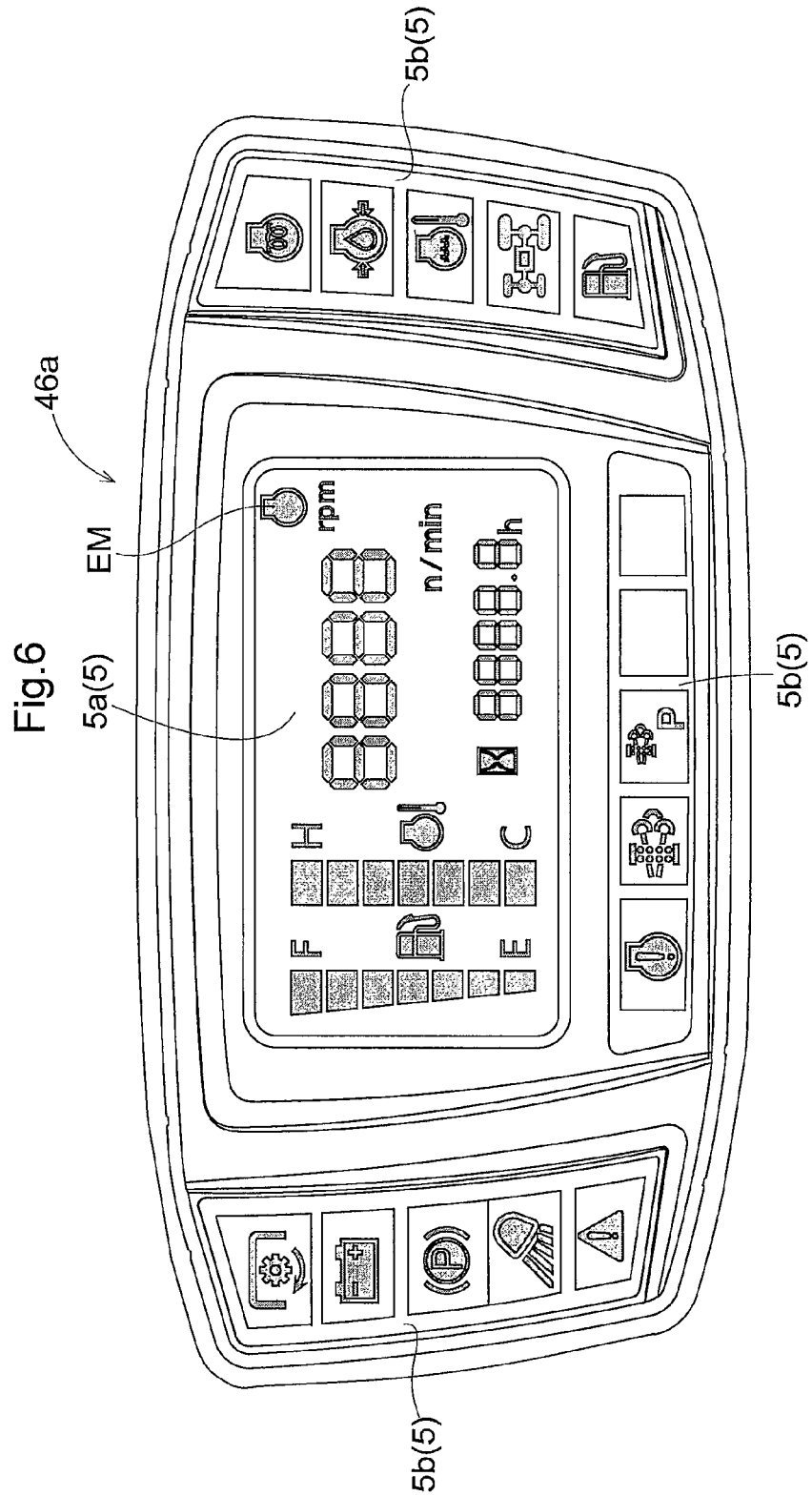
FIG. 6 is a front view of a panel module.

As shown in FIG. 6, the first panel module 46*a* incorporates a large-size flat display panel 5*a* as a first display unit constituting a first display section and further incorporates LED panel units 5*b* on the opposed sides thereof as a second display unit constituting a second display section. The flat panel display 5*a* displays numerical values, characters, signs, graphic illustrations indicative of various kinds of information. For the sake of enhanced visibility of these displays by the driver seated at the driver's seat 13, as may be apparent from the illustration in FIG. 5, the flat panel display 5*a* is disposed with an inclination so that the normal line of its displaying plane and the rotational axis of the steering wheel may intersect each other at a point upwardly of the steering wheel. Namely, the steering wheel 40 is operated by a driver's hands and the driver's seat 13 is disposed such that the face of the driver may be located rearwardly of the extension line of the rotational axis of the steering wheel. Then, if the flat display panel 5*a* is disposed with such inclination as described above, the seated driver can view the screen of this flat display panel 5*a* more easily.

Incidentally, the flat panel display 5*a* can be formed generally of liquid crystals. However, the invention is not limited thereto. Other display such as organic electroluminescence, LED (light emitting diodes), VFD (vacuum fluorescent display), PDP (plasma display panel), etc. can be used instead. Further, instead of the LED panel unit 5*b*, a panel unit comprised of other illumination devices or light emitting elements may be employed. Namely, what is referred to as a "flat panel display" 5*a* in this invention means any panel type display introduced as a commercial product after the more conventional CRT type display, and its display face may be curved.

As shown in FIG. 3, FIG. 4 and FIG. 5, an opening 18*a* for mounting a headlamp 18 is provided at the center of the front panel 43*b* slightly downwardly of the first panel module 46*a*. The headlamp 18 is disposed with its optical axis oriented slightly downward than the horizontal, so that this headlamp 18 is capable of directly illuminating the surrounding of the mower unit 2, too. The most part of the headlamp 18 except for its shield glass is accommodated in the inside space of the first panel module 46*a*, and the headlamp 18 has such an outer appearance that hardly projects to the outside from the recessed curved face forming the intermediate portion of the front panel 43*b*.

As may be apparent from FIG. 5, the front side of the front frame 10*a* has an approximately 30 degrees of forwardly upward inclination and from its leading end top face, the first steering post 43, more particularly the rear panel 43*b*, extends vertically. Namely, the first steering post 43 extends with an approximately 60 degrees of inclination relative to the ground surface. Further, the displaying face normal line of the flat panel display 5*a* forms about 45 degrees relative to the horizontal, so that this displaying face normal line intersects the rotational axis of the steering wheel 40 at a position adjacent the steering wheel 40, preferably, a position upwardly thereof. Incidentally, the optical axis of the headlamp 18 has an approximately 10 degrees of downward inclination.

Figure 7:
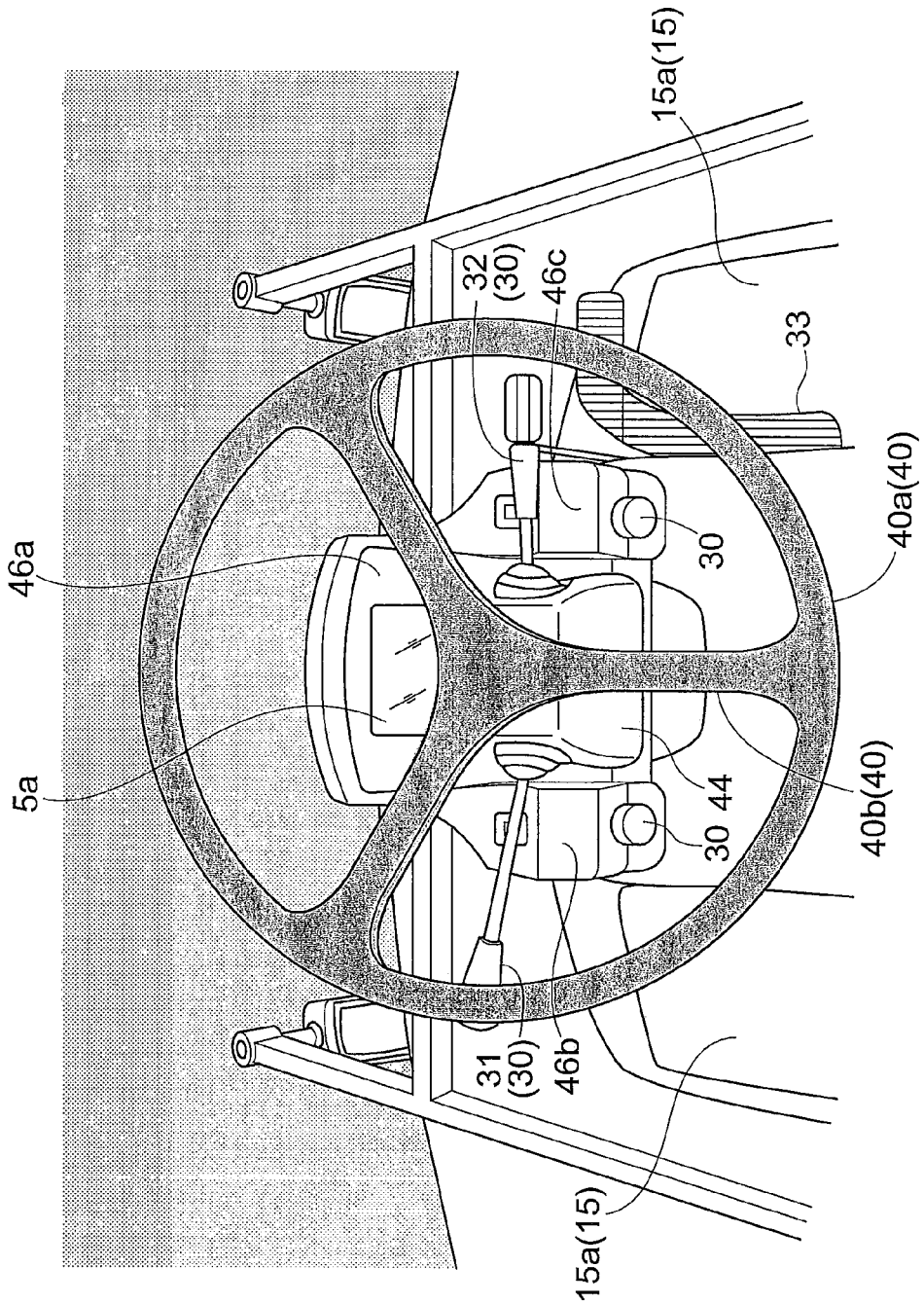
FIG. 7 is an outer appearance view showing the steering device as seen from a driver.

The above-described positional relationship between the flat panel display 5*a* (i.e. the first panel module 46*a*) and the steering wheel 40; and the shapes of the ring 40*a* and the spokes 40*b* together constituting the steering wheel 40 contribute to improvement in the visibility of the flat panel display 5*a* by the driver seated at the driver's seat 13. FIG. 7 schematically shows the field of view seen from the driver seated at the driver's seat 13 as the viewpoint. As may be understood from this FIG. 7 illustration, when seen along the rotational axis of the steering wheel 40, at least one opening delimited by the spokes 40*b* and the ring 40*a* of the steering wheel 40 is formed larger than the flat panel display 5*a*. With this arrangement, the driver can see with good visibility the screen of the flat panel display 5*a* through this opening. Whereas, the length in the vehicle body width direction of the total operation face combining the operation face of the second module panel 46*b* and the operation face of the third module panel 46*c*, on which operation input devices such as buttons, switches or the like to be operated by the left hand and the right hand, respectively, is set greater than the flat panel display 5*a*. With this arrangement, the operation face of the second module panel 46*b* and the operation face of the third module panel 46*c* protrude beyond the flat panel display 5*a* to the outside in the vehicle body width direction, whereby the hand operability of the second panel module 46*b* and the third panel module 46*c* is improved. In the instant embodiment, in the second operation face constituted by the second panel module 46*b*, manual operation selection buttons, an illumination switch for DPF (Diesel Particulate Filter) are disposed, whereas in the second operation face constituted by the third panel module 46*c*, an automatic operation input button, a key switch, etc. for the PDF as an operation input device 30, are disposed.

From the left and right side faces of the second steering post 44, a first operation lever 31 and a second operation lever 32 protrude, respectively. In this example, the first operation lever 31 protruding from the left side face of the second steering post 44 is a tilt locking/releasing lever for the second steering post 44, i.e. for the steering wheel 40. The second operation lever 32 protruding from the right side face of the second steering post 44 is an accelerator lever.

For obtaining better visibility through the openings of the steering wheel 40, it is preferred that the ring 40*a* and the spokes 40*b* be formed as narrow as possible so as to increase the area of the openings.

Further, in the instant embodiment, the ring 40*a* is formed circular, but this can be formed oval or polygonal if appropriate. The spokes 40*b* too can be of any other type than the three-spoke type illustrated. But, good visibility through the opening should be ensured in doing so.

As may be understood from FIG. 1, in the left and right peripheral areas of the steering device 4 and the driver's seat 13 upwardly of the front frame 10*a* and in the areas between the steering device 4 and the driver's 13, there is formed a floor 15. In this, from the respective opposed sides of the steering device 4 to the rear side, footrest sections 15 are formed upwardly of forwardly rising inclined portions, and on these, anti-slipping material is provided. Instead of providing such anti-slipping material, the plate member constituting the floor 15 may be provided with an anti-slippage function with formation of projections or the like thereon. On the floor 15, there are mounted such components as a speed changing pedal 33, a parking lever 34, as well as a PTO clutch lever 35 for a PTO clutch for switching ON/OFF PTO power transmission for transmitting engine power to the mower unit 2.

The rear half region of the vehicle body 1 forms a power source region. Though not shown in FIG. 1 as being covered with a hood unit 8, in the instant embodiment, a water-cooled engine (simply the "engine" hereinafter) and engine auxiliary devices are disposed. Between the driver's seat 13 and the hood unit 8, a portal-shaped framework commonly called a ROPS 14, is disposed vertically.

Figure 8:
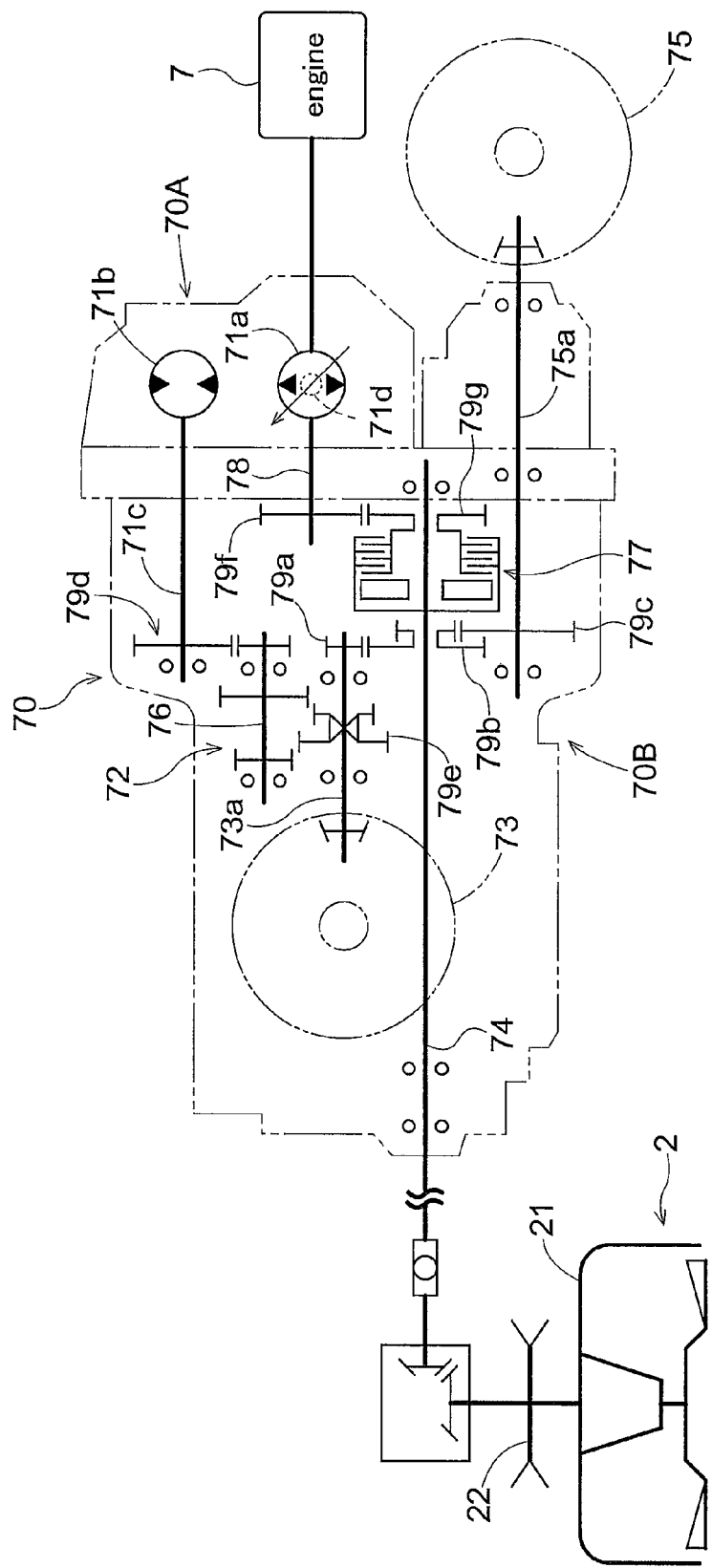
FIG. 8 is a diagram showing arrangement of a transmission.

FIG. 8 shows a transmission 70 of this front mower. This transmission 70 includes a stepless speed changer device 70A for changing the speed of the output of the engine 7 in a stepless manner, and a gear transmission device 70B for transmitting speed-changed power to the front wheels 11 and the rear wheels 12 and transmitting the engine output to the mower unit 2, bypassing the stepless speed changer device 70A. The transmission 70 further includes a PTO shaft 74 as a part of a power transmission pathway between the engine 7 and the mower unit 2.

The stepless speed changer device 70A consists of a variable displacement type hydraulic pump 71a and a hydraulic motor 71b driven with supply of work oil from this hydraulic pump 71a. Power from an output shaft 71c of the hydraulic motor 71b is transmitted via an auxiliary speed changer device 72 constituting the gear transmission device 70B and a bevel pinion shaft 73a to a front wheel differential device 73. Power from a gear 79a formed on the bevel pinion shaft 73a is transmitted to a rear wheel differential device 75 via an intermediate gear 79b loosely mounted on the PTO shaft 74 via a needle bearing and an intermediate transmission shaft 75a having a gear 79c meshing therewith.

Also, in the lateral face of the hydraulic pump 71a, a trunnion shaft 71d for adjusting the discharge amount of work oil from the hydraulic pump 71a is mechanically connected to the speed changer pedal. Incidentally, in order to realize a cruising travel (constant speed travel), though not shown, there is also provided a retaining mechanism for retaining the trunnion shaft 71d at a selected position. The auxiliary speed changer device 72 receives the power from the output shaft 71c of the hydraulic motor 71b via a gear pair 79d. For selective meshing with a high-speed gear and a low-speed gear mounted on a counter shaft 76 extending parallel with the bevel pinion shaft 73a, there is provided a shift gear 79e splined on the bevel pinion shaft 73a. And, this shift gear 79e is mechanically coupled with an auxiliary speed changer lever 36 disposed adjacent the driver's seat 13. An input gear 79g meshed with an output gear 79f coupled with a live shaft 78 extending through the hydraulic pump 71a of the stepless speed changer device 70A is loosely mounted on the PTO shaft 74 via a bearing, and between this input gear 79g and the PTO shaft 74, there is mounted a hydraulic PTO clutch 77. The PTO shaft 74 is connected to a belt transmission mechanism 22 of the mower unit 2. The mower unit 2 includes three grass cutting/mowing blades 23 shrouded by a mower deck 21. The blades 23 are driven to rotate about a vertical axis by the belt transmission mechanism 22. Each blade 23, as well-known, has a band-plate like shape and includes wind-generating projections called wind-generating vanes. These projections generate an airflow for conveying cut grass clippings to a side discharging exit of the mower deck in association with rotation of the blades 23.

Figure 9:
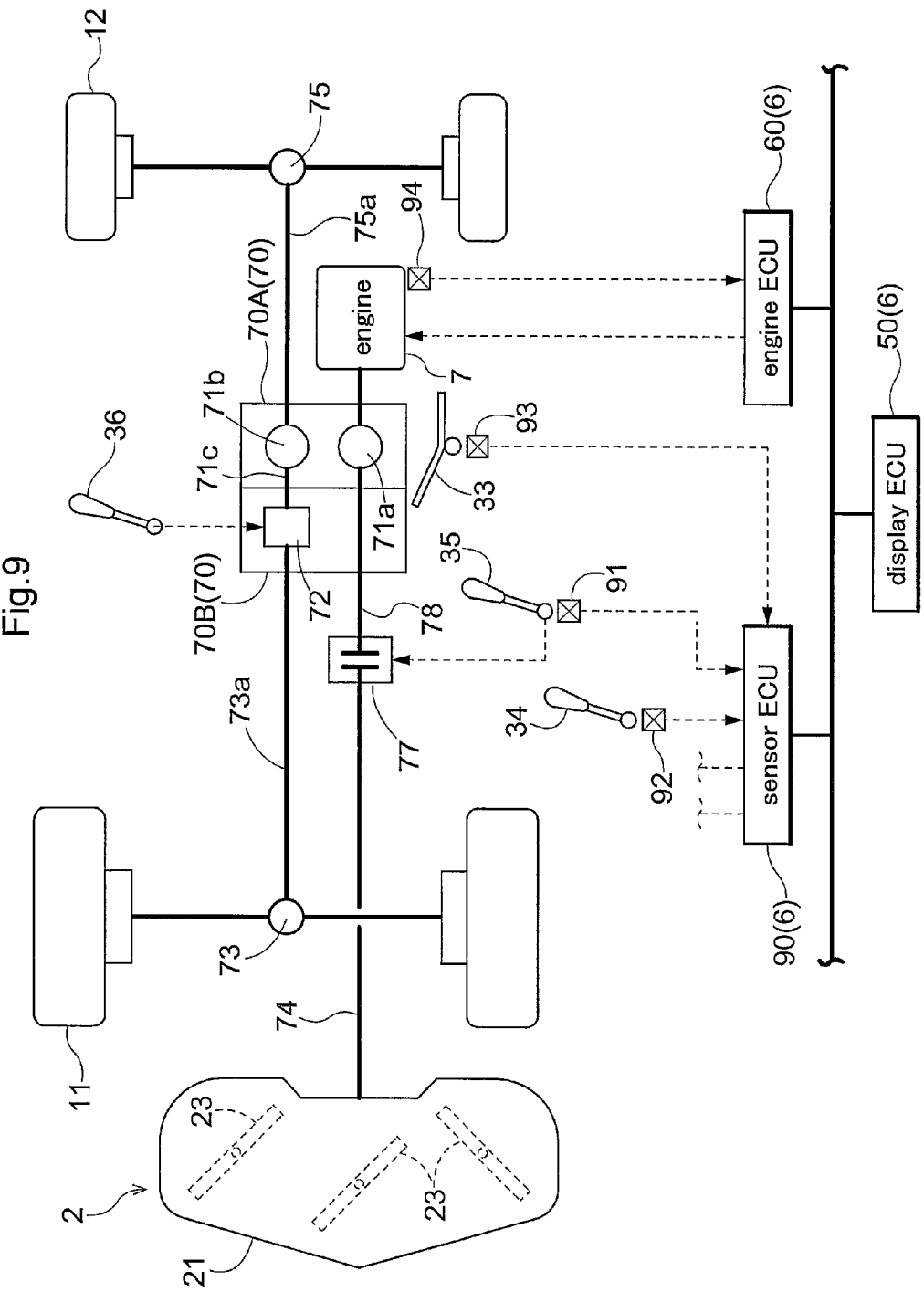
FIG. 9 is a block diagram showing an engine control system and a display control system.
Figure 10:
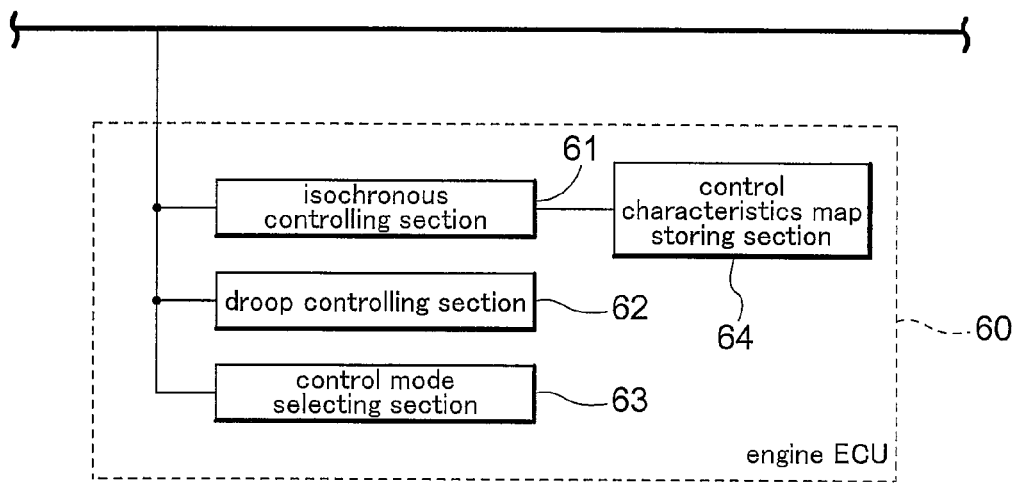
FIG. 10 is a block diagram showing an engine ECU.

FIG. 9 shows a block diagram of an engine control system and a display control system of this front mower, showing a display ECU 50, an engine ECU 60 and a sensor ECU 90 as an electronic control unit (ECU) 6 relating particularly to the engine control system and the display control system in this front mower.

In FIG. 9, the sensor ECU 90 is provided as a control unit configured to generate and output vehicle condition signals based on detection signals received from the various detection devices. To this sensor ECU 90, there are connected a PTO clutch sensor (one of the detection devices) 91 for detecting ON/OFF position of the PTO clutch lever 35 for operating the PTO clutch 77, a parking sensor (another detection device) 92 for detecting ON/OFF position of the parking lever 34, a speed position sensor 93 for detecting a swash plate angle of the hydraulic pump 71a, etc.

In this front mower, the PTO shaft 74 transmits the power from the engine 7 to the mower unit 2. Therefore, the PTO clutch sensor 91 for detecting the position of the PTO clutch lever 35 for the PTO clutch 77 for turning ON/OFF this power transmission functions as a "mower driving detecting section" for detecting the power transmission condition to the mower unit 2. In this, one of such possible power transmission conditions to the mower unit 2 is power transmission to the mower unit 2 with ON position of the PTO clutch 77 and the resultant rotation of the blades 23. Another such condition is blocking of power transmission to the mower unit 2 in association with the OFF position of the PTO clutch 77 and the resultant stop of the blades 23.

The engine ECU 60 includes an isochronous controlling section 61, a droop controlling section 62, a mode selecting section 63 and a map table 64.

The isochronous controlling section 61 has an isochronous control function for maintaining the rotational speed of the engine 7 at a predetermined fixed value independently of engine load. When this isochronous control mode is selected, once a certain engine rotational speed is set by the driver or set in advance, for instance, the actual engine rotational speed will be maintained at this set rotational speed, irrespectively of variation occurring in the engine load. For instance, fuel injection amount (or the governor position) will be increased in association with increase in the engine load (or the engine torque), thereby to maintain the engine rotational speed constant. As this isochronous control per se is well-known, further detailed discussion thereof will be omitted herein. But, explanation thereof will be found in some patent publications, represented by US 2009/0265082 A1, JP 2002-106401 A, etc.

The droop controlling section 62 has a droop control function for controlling the engine 7 in a droop control mode for varying the engine rotational speed in dependence on the engine load. When this droop control mode is selected, drop in the engine rotational speed is permitted in accordance with rise in the load from the zero load condition (idling operation). The driver may avoid such drop in engine rotational speed by stepping on the accelerator pedal in response to the engine rotational speed drop. However, this drop in the engine rotational speed may be utilized for traveling. As this droop control per se is well-known, further detailed discussion thereof will be omitted herein. But, explanation thereof will be found in the above-identified publications, for instance.

The control characteristics map storing section 64 stores therein a plurality of so-called isochronous control characteristics maps as a group of isochronous control characteristics maps which define fuel injection amounts (or governor positions) corresponding to various engine loads (engine rotational speed reduction) in order to avoid or limit reduction of engine rotational speed within a certain range. In operation, as the isochronous controlling section 61 makes an access to this control characteristics map storing section 64 and determines a fuel injection amount (or a governor position) corresponding to an engine load (engine rotational speed reduction). To this end, the engine ECU 60 inputs a detection signal from the engine rotational speed sensor 94 mounted on the engine 7.

The control mode selecting section 63 selects the engine control by the isochronous controlling section 61 if power transmission to the mower unit 2 is detected by the mower driving detecting section. On the other hand, when the power transmission to the mower unit 2 is blocked, the control mode selecting section 63 selects the engine control by the droop controlling section 62. As described above, in this embodiment, the PTO clutch sensor 91 is employed as the mower driving detecting section. Therefore, if the PTO clutch lever 35 is operated to turn ON (i.e. engage) the PTO clutch 77, the isochronous control will be executed for the engine 7. Whereas, if the PTO clutch lever 35 is operated to turn OFF (i.e. disengage) the PTO clutch 77, the droop control will be executed for the engine 7.

For instance, when the PTO clutch lever 35 is turned ON to carry out a grass (lawn) mowing operation, the isochronous control is executed, so that an engine rotational speed defined by the isochronous control characteristics map is maintained. As a result, a rotational speed suitable for the blades 23 of the mower unit 2 will be maintained, so an appropriate mowing operation can be carried out. In this, "a rotational speed suitable for the blades 23 of the mower unit 2" means a rotational speed which optimizes the evaluations items such as mowing quality, noise generation, fuel consumption, etc. However, such rotational speed will differ depending also on the mowing conditions such as the type of the lawn, the condition of the lawn, etc. Therefore, there may be provided in advance a plurality of isochronous control characteristics maps, so that one of them may be selected depending on the particular mowing condition.

Incidentally, during execution of the isochronous control mode, the engine rotational speed remains substantially constant, thus providing the driver with a driving feel different from the normal driving feel. Therefore, this execution of the engine control by the isochronous controlling section 61 will be informed or alerted to the driver. As an alerting device for use in this alerting (informing) can advantageously be lighting or flashing of a lamp or generation of an alert sound by a buzzer, etc. In the instant embodiment, in the flat panel display 5a, there is provided an isochronous control ON displaying icon in the vicinity of the displaying area for displaying an engine rotational speed and this icon is lit or flashed as a displaying section for displaying ongoing execution of the isochronous control.

When the PTO clutch lever 35 is turned OFF, the PTO clutch 77 is disengaged, so that no rotational power is transmitted to the mower unit 2 and the blades 23 are stopped. That is, there is not provided a work-accompanied traveling involving a simultaneous grass mowing operation, but provided no-work-accompanied traveling just like traveling of a passenger automobile. Therefore, as triggered by an OFF operation of this PTO clutch lever 35, the engine drive mode is shifted to the droop control by the droop controlling section 62.

As may be apparent from FIG. 11, to the display ECU 50, the first panel module 46a is connected. This first panel module 46a includes the flat panel display 5a as the first display section and the LED display units 5b as the second display section. The flat panel display 5a, as the first display section, displays various vehicle condition information based on various vehicle condition signals received from the sensor ECU (one of the control units) 90 via the display ECU 50. The LED panels 5b, as the second display section, display vehicle conditions based on the detection signals received via the sensor ECU 90 or directly from the detection device.

The display ECU 50 inputs information relating mainly the engine as vehicle control error message from the engine ECU 60, e.g. a signal indicating failure of engine start, a signal indicating an engine rotational speed, a signal indicating data of an hour meter cumulative engine operation time, a signal indicating cooling water temperature, a signal indicating an engine error message, etc. The display ECU 50 also inputs vehicle condition signals indicative of operational conditions of the operation input devices 30 such as the operational levers or switches/buttons from the sensor ECU.

In this embodiment, as shown in FIG. 6, at the center portion of the first panel module 46a, the flat panel display 5a is disposed and on the left and right and lower sides thereof, the LED panels 5b are disposed. The screen of the flat panel display 5a is divided into a fuel meter area, a water temperature meter area, an engine rotational speed displaying area, an hour meter displaying area and an engine mode displaying area. The engine mode displaying area is provided on the right-upper side of the engine rotational speed display area in the case of the example illustrated in FIG. 6 and there is formed a bottle-like engine mode icon EM. Lighting of this engine mode icon EM indicates selection of the isochronous control mode. Non-lighting of this engine mode icon EM indicates selection of the droop control mode. The hour meter displaying area is composed of alphabet/numeral displaying segments and is used also as a displaying area for a vehicle control error message and displaying area for a maintenance message urging a vehicle maintenance operation. Therefore, the segments of this hour meter displaying area display not only a numerical value of the hour meter, but also an error code indicative of a vehicle control error message such as "Err00" or a service code indicative of a message urging a maintenance operation such as "Ser1", at predetermined timings. In particular, this service code is displayed at the time of key-ON operation after lapse of a predetermined period, thus avoiding interference with other displays. Further, regarding displaying of the hour meter and the error code, if there occurs a request of displaying an error code, this will be displayed in repetition for a plurality of times at intervals such as 2 seconds interval, with the error code displaying interrupting the hour code displaying (more particularly, a numerical value indicative of an hour meter) effected by the segments.

As may be understood or presumed from the marks or graphical representations of the icons shown in FIG. 6, the display items classified by the marks or icons visually recognized by the LED lighting include e.g. battery charge, parking brake, headlamp, PTO clutch, cooling water temperature, warning of amount of fuel remaining, etc. In the instant embodiment, the vehicle condition signals indicative of engine conditions are first processed by the engine ECU 60 and then sent to the display ECU 50 to be directly sent to the first LED panel 5b for LED lighting control. An example of this is a cooling water temperature. The other vehicle condition signals, e.g. a detection signal from the parking sensor 92 for detecting ON/OFF position condition of the parking lever 34 includes two routes of signal transmission line, so that these signals are transmitted not only to the engine ECU 60, but transmitted directly also to the first LED panel 5b for its LED lighting control.

The ON/OFF position of the parking brake, that is, the ON/OFF position of the parking lever 34, is a condition for engine start. So, the detection signal from the parking sensor 92 is used for determination of allowing or not allowing engine start by the engine ECU 60. Therefore, with the above-described two routes of signal transmission line arrangement, if the parking brake LED is ON (ON of the parking brake) despite displaying of engine start being not allowed, it may be understood that the other engine start conditions than the parking brake are not satisfied. Conversely, if the parking brake LED is OFF, but the message of engine start not allowed is not displayed, it may be assumed that some trouble has occurred in the signal transmission line of the parking sensor 92.

Incidentally, in the exemplary arrangement shown in FIG. 11, the flat panel display 5a is used as the first display section for displaying vehicle condition information based on various vehicle condition signals received from the sensor ECU 90 via the display ECU 50, whereas the LED panels 5b are used as the second display section for displaying vehicle conditions detected based on the detection signals via the sensor ECU 90 from the detection devices or directly from the detection devices. Instead of this arrangement, the first display section and the second display section may be provided as separate independent display panels.

What is claimed is:

1. A work vehicle having a ground-work unit that is mounted under a frame supported by front wheels and rear wheels and disposed forwardly of the front wheels, the work vehicle comprising:
   a steering post disposed upwardly of the frame;
   a steering wheel supported to the steering post and consisting of spokes and a ring; and
   a man-machine interface face formed in the steering post downwardly of the steering wheel and around a rotational axis of the steering wheel;
   wherein the man-machine interface face includes a display face having a flat panel display and an operation face having an operation input device and disposed adjacent the display face, the display face being disposed on a front side of the steering post, the operation face including a left-side operation face disposed on a left side of the steering post and facing the steering wheel, and a right-side operation face disposed on a right side of the steering post and facing the steering wheel;
   wherein the steering wheel is greater in size than the display face as seen in a direction of the rotational axis of the steering wheel, and the operation face is greater in length than the flat panel display in a direction of vehicle width; and
   wherein, as seen in the direction of the vehicle width, an entire length from the left-side operation face across the steering post to the right-side operation face is greater than a length of the display face and smaller than a length of the steering wheel.

2. The work vehicle according to claim 1, wherein at least one opening delimited by the spokes and the ring of the steering wheel is formed larger than the flat panel display.

3. The work vehicle according to claim 1, wherein, as seen in the direction of the rotational axis of the steering wheel, at least one opening delimited by the spokes and the ring of the steering wheel is formed larger than the left-side operation face and the right-side operation face to secure a driver's view through the opening to the left-side operation face and the right-side operation face.

4. The work vehicle according to claim 1, wherein the flat panel display is disposed with an inclination so that a normal line of the display face and the rotational axis of the steering wheel intersect each other upwardly of the steering wheel.

5. The work vehicle according to according to claim 1, wherein the steering post consists of a first steering post supported to the frame and a second steering post supported to the first steering post to be pivotable in a front/rear direction of a vehicle body and supporting the steering wheel.

6. The work vehicle according to claim 5, wherein the first steering post consists of a base panel fixed to a front end of the frame and an auxiliary panel fixed to the base panel in such a manner as to cover a front side of the base panel.

7. The work vehicle according to claim 6, wherein the display face is formed in an upper face of the auxiliary panel.

8. The work vehicle according to claim 6, wherein a lower portion of the auxiliary panel is formed as a skirt portion for covering a front end of the frame from a front side thereof.

9. A work vehicle having a ground-work unit that is mounted under a frame supported by front wheels and rear wheels and disposed forwardly of the front wheels, the work vehicle comprising:
   a steering post disposed upwardly of the frame;
   a steering wheel supported to the steering post and consisting of spokes and a ring, at least one opening being formed as being delimited by the spokes and the ring;
   a man-machine interface face formed in the steering post downwardly of the steering wheel and around a rotational axis of the steering wheel;
   wherein the man-machine interface face includes a display face having a flat panel display and an operation face having an operation input device and disposed adjacent the display face, the display face being disposed on a front side of the steering post, the operation face including a left-side operation face disposed on a left side of the steering post and facing the steering wheel and a right-side operation face disposed on a right side of the steering post and facing the steering wheel; and
   wherein the opening of the steering wheel is larger than each of the flat panel display, the left-side operation face, and the right-side operation face to secure a driver's view through the opening to the left-side operation face and the right-side operation face.

10. The work vehicle according to claim 9, wherein the flat panel display is disposed with an inclination so that a normal line of the display face and the rotational axis of the steering wheel intersect each other upwardly of the steering wheel at an angle of from 5 to 30 degrees.

11. A front mower having a mower unit that is mounted under a frame supported by front wheels and rear wheels and disposed forwardly of the front wheels, the front mower comprising:
   a steering post disposed upwardly of the frame;
   a steering wheel supported to the steering post and consisting of spokes and a ring, the steering wheel having at least one opening delimited by the spokes and the ring of the steering wheel; and
   a man-machine interface face formed in the steering post downwardly of the steering wheel and around a rotational axis of the steering wheel,
   wherein the man-machine interface face includes a display face having a flat panel display and an operation face having an operation input device and disposed adjacent the display face, the operation face including a left-side operation face disposed on a left side of the steering post and facing the steering wheel, and a right-side operation face disposed on a right side of the steering post and facing the steering wheel, and
   wherein as seen in the direction of the vehicle width, an entire length from the left-side operation face across the steering post to the right-side operation face is greater than a length of the display face and smaller than a length of the steering wheel.

\* \* \* \* \*

UNITED STATES PATENT AND TRADEMARK OFFICE
CERTIFICATE OF CORRECTION

| | | |
|---|---|---|
| PATENT NO. | : 8,888,133 B2 | Page 1 of 1 |
| APPLICATION NO. | : 13/775544 | |
| DATED | : November 18, 2014 | |
| INVENTOR(S) | : Tsuchihashi et al. | |

It is certified that error appears in the above-identified patent and that said Letters Patent is hereby corrected as shown below:

In the claims

Column 11, Line 54, Claim 5, delete "according to according to" and insert -- according to --

Column 12, Line 24, Claim 9, delete "wheel" and insert -- wheel, --

Signed and Sealed this
Seventeenth Day of March, 2015

Michelle K. Lee
*Director of the United States Patent and Trademark Office*